May 13, 1952     G. C. ABBOTT     2,596,109
AUTOMATIC WORK FEEDING MECHANISM
Filed Aug. 27, 1946     7 Sheets-Sheet 2

INVENTOR.
Gail C. Abbott
BY Strauch & Hoffman
ATTORNEYS

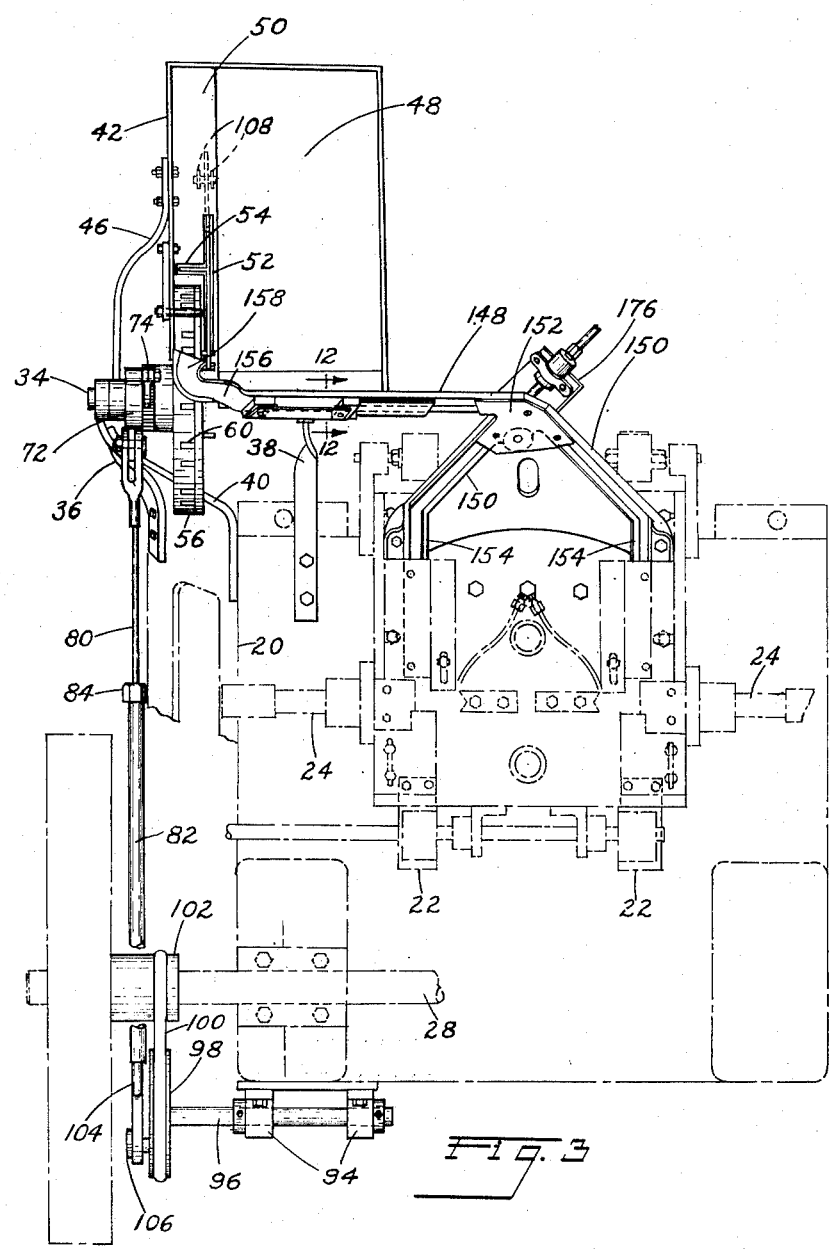

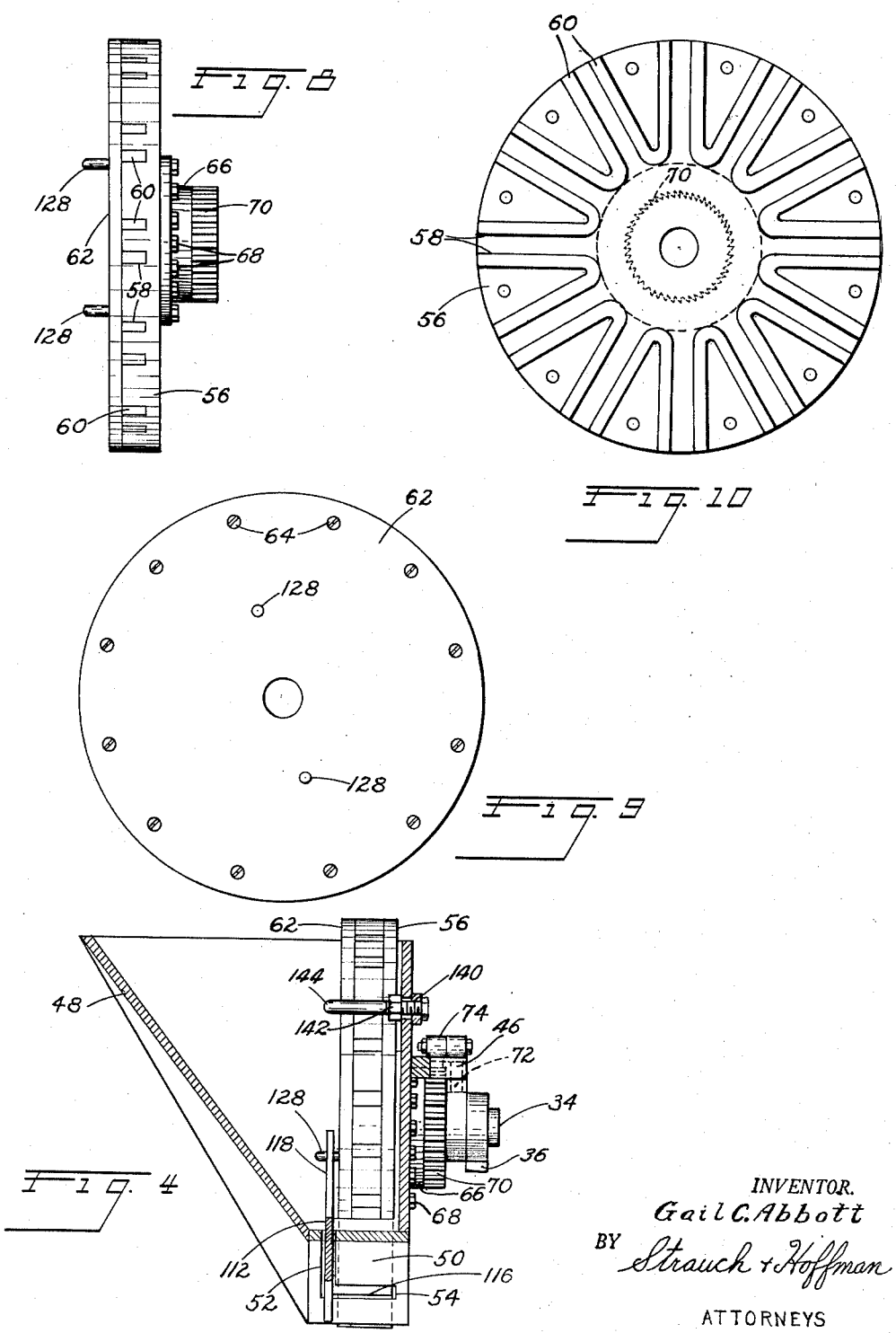

May 13, 1952     G. C. ABBOTT     2,596,109
AUTOMATIC WORK FEEDING MECHANISM
Filed Aug. 27, 1946     7 Sheets-Sheet 5
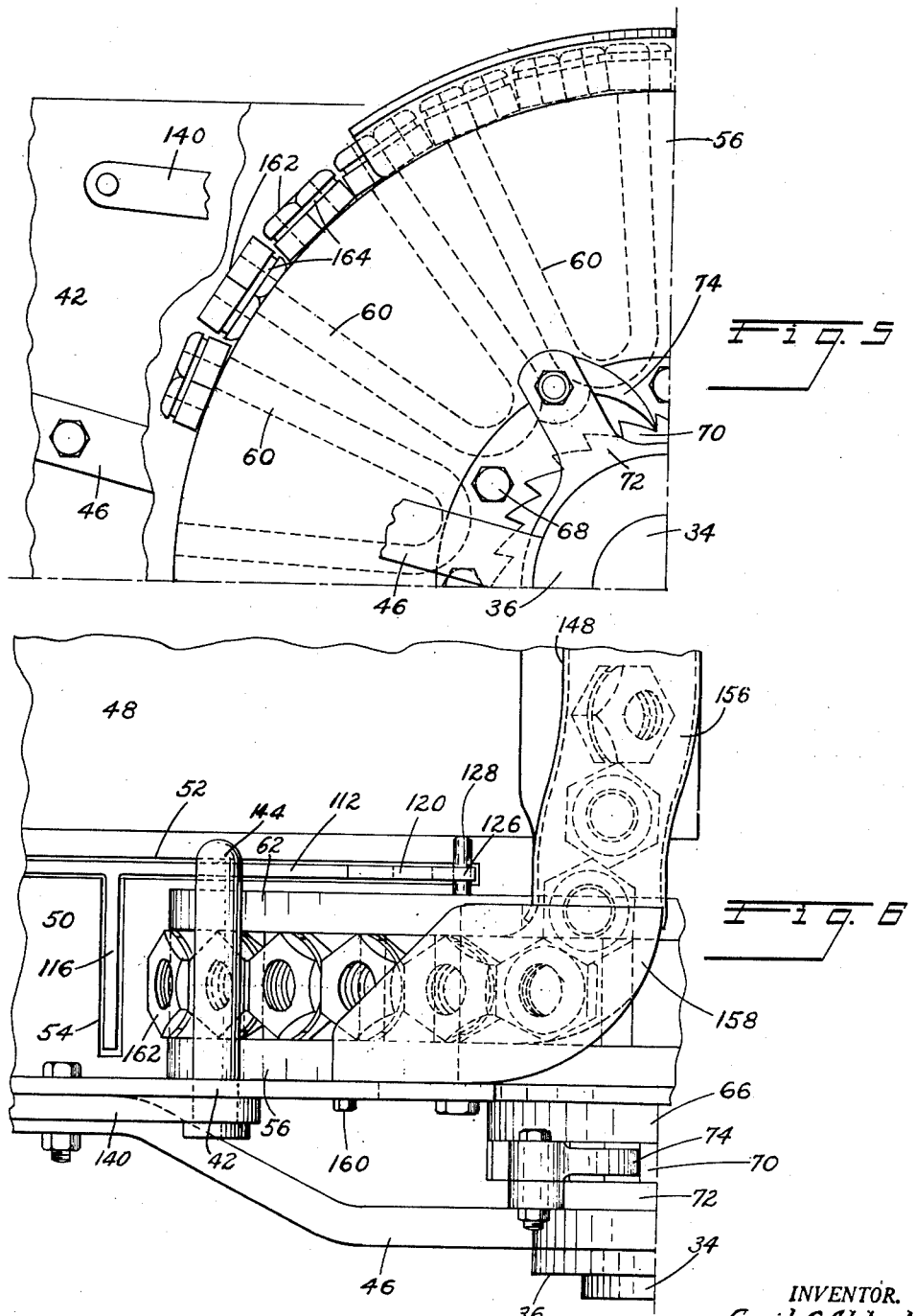
INVENTOR.
Gail C. Abbott
BY Strauch & Hoffman
ATTORNEYS May 13, 1952     G. C. ABBOTT     2,596,109
AUTOMATIC WORK FEEDING MECHANISM
Filed Aug. 27, 1946     7 Sheets-Sheet 6
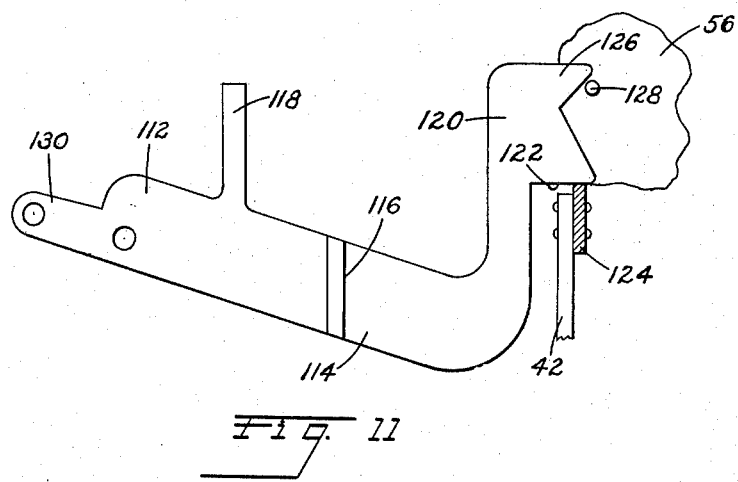
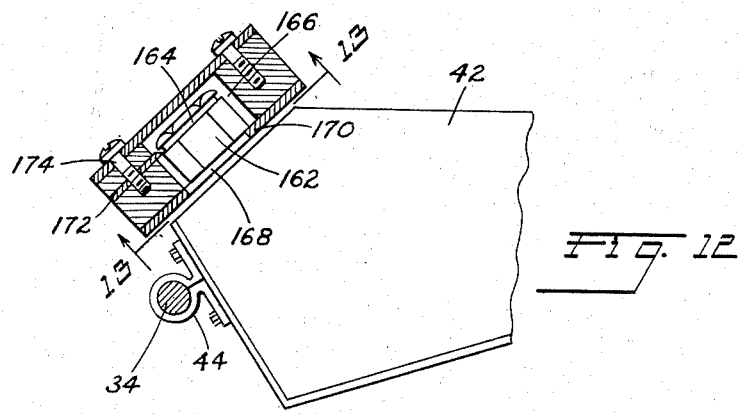
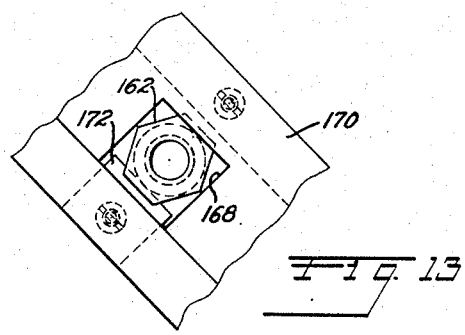
INVENTOR.
*Gail C. Abbott*
BY *Strauch & Hoffman*
ATTORNEYS May 13, 1952 G. C. ABBOTT 2,596,109
AUTOMATIC WORK FEEDING MECHANISM
Filed Aug. 27, 1946 7 Sheets-Sheet 7
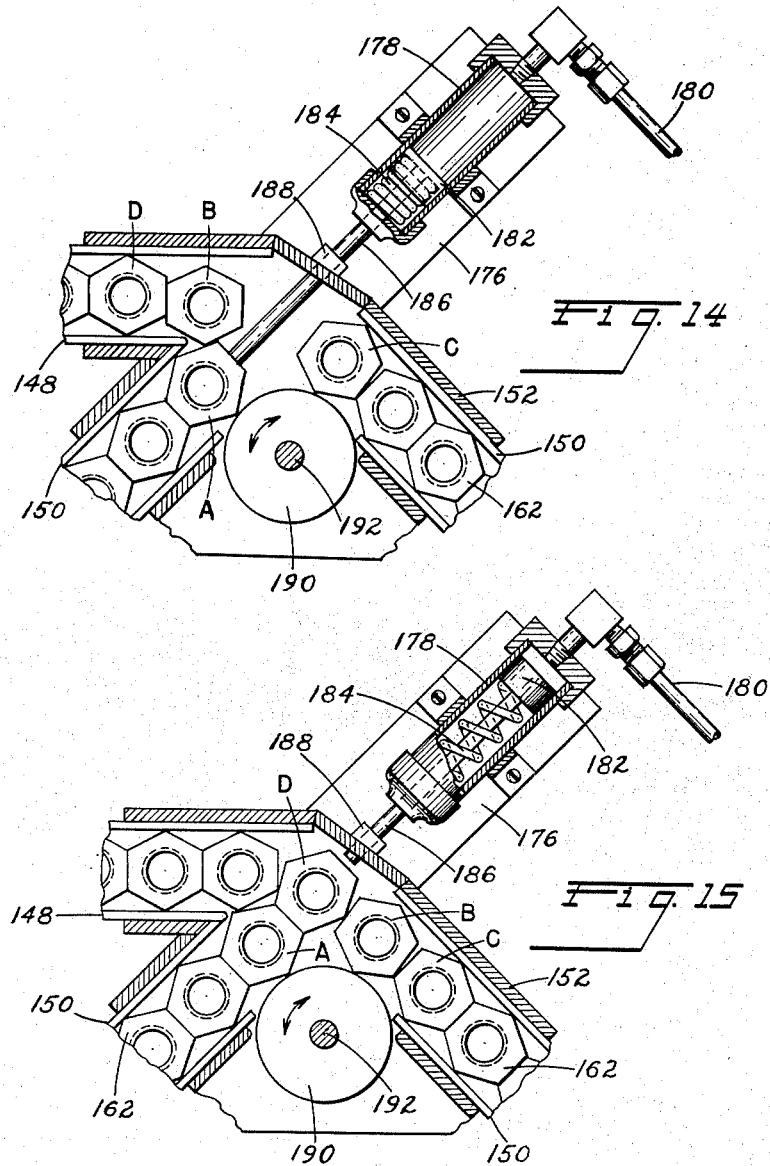
INVENTOR.
Gail C Abbott
BY Strauch + Hoffman
ATTORNEYS Patented May 13, 1952

2,596,109

UNITED STATES PATENT OFFICE 2,596,109

AUTOMATIC WORK FEEDING MECHANISM

Gail C. Abbott, South Whitley, Ind., assignor to Grip Nut Company, South Whitley, Ind., a corporation of Illinois Application August 27, 1946, Serial No. 693,173

2 Claims. (Cl. 10—164)

This invention relates to feed mechanism for automatic machines and more particularly to means for continuously supplying articles or work-pieces from a hopper and properly positioning the same to be operated upon by the machine.

As illustrative of the present disclosure, I have selected an embodiment of my invention which is designed for application and use in connection with a lock-nut making machine, preferably of the multiple unit type, shown and described in the co-pending application of Chester D. Tripp, Serial No. 568,501, filed December 16, 1944, issued January 2, 1951, as Patent No. 2,536,110. In this application, the nuts are fed by hand to two conveyors, intermittently operated to convey the nuts in succession to automatic gripping devices which grip and hold the nuts in accurate alignment with vertically reciprocating indenting dies. Therefore, in the high speed operation of the machine, the constant presence of an attendant is required to maintain an uninterrupted supply of nuts to the conveyors.

It is the general object and purpose of the present invention to render such machines wholly automatic by the provision of simply and reliably operating mechanism for continuously feeding nuts or other comparatively small work-pieces from a supply hopper to one or more work receiving stations of the machine, and in the required position for accurate operation thereon by the machine tool or tools.

It is one of the important objects of the invention to provide a guide chute for the nuts or other work pieces and means associated therewith embodying a power operated pick-up member having means for singly delivering the work pieces in rapid succession from a supply hopper into said chute.

Another object, in a preferred embodiment of the invention, resides in the provision of a pick-up member in the form of a rotatably mounted disk carrying a plurality of permanent magnet bars arranged to attract and hold the individual work pieces upon the periphery of said disk.

One of the more specific objects is to provide means actuated by the rotatable pick-up disk to lift a work piece from the bottom of the hopper adjacent to the disk and dispose the same in proper position to be picked up by one of the magnet bars, while simultaneously vibrating the hopper, together with means for dislodging and returning to the hopper work-pieces which may be improperly positioned on the periphery of the disk.

A further important object of the invention resides in the provision of selecting means associated with the work guiding chute to permit passage therethrough of correctly positioned work-pieces and return incorrectly positioned work-pieces to the hopper.

In the multiple unit type of machine the main work guiding chute is connected with vertically inclined branch chutes respectively discharging the work-pieces to the work stations of the machine, and it is an additional object of my invention to provide simple and effectively operating means for controlling the alternate passage of work-pieces from said main chute into the branch discharge chutes.

Finally, it is the aim and purpose of the present invention to provide a work feeding mechanism for automatic machines as above characterized, which comprises a compact and inexpensive assembly of a minimum number of durably constructed elements, assuring positive functional cooperation with high speed operation of the machine and maximum volume output of the finished product.

With the above and other subordinate objects in view, the invention comprises the improved work feeding mechanism, and the construction and relative arrangement of its several parts, as will hereinafter be more fully described, illustrated in the accompanying drawings, and subsequently incorporated in the subjoined claims.

In the drawings, wherein I have disclosed one simple and practical embodiment of the present invention, and in which similar reference characters designate corresponding parts throughout the several views:

Figure 3 is a top plan view;

Figure 4 is a transverse sectional view taken substantially on the line 4—4 of Figure 2;

Figure 5 is an enlarged fragmentary side elevation of the pick-up device and work transfer means;

Figure 6 is a top plan view thereof;

Figure 8 is an enlarged plan view of the magnetic pick-up wheel or disk;

Figure 9 is a side elevation thereof;

Figure 10 is a similar view, the face plate being removed to show the arrangement of the magnet bars;

Figure 11 is a detail side elevation on an enlarged scale of the work positioning and hopper vibrating lever and associated parts;

Figure 12 is a detail transverse section of the main guide chute, taken substantially on the line 12—12 of Figure 3;

Figure 13 is a fragmentary front side elevation of the main guide chute as indicated by the line 13—13 on Figure 12;

Figure 14 is a detail plan view partly in section, illustrating means for alternately directing work-pieces from the main guide chute into the diverging branch chutes; and Figure 15 is a similar view showing the work directing plunger in normal retracted position.

Figure 1:
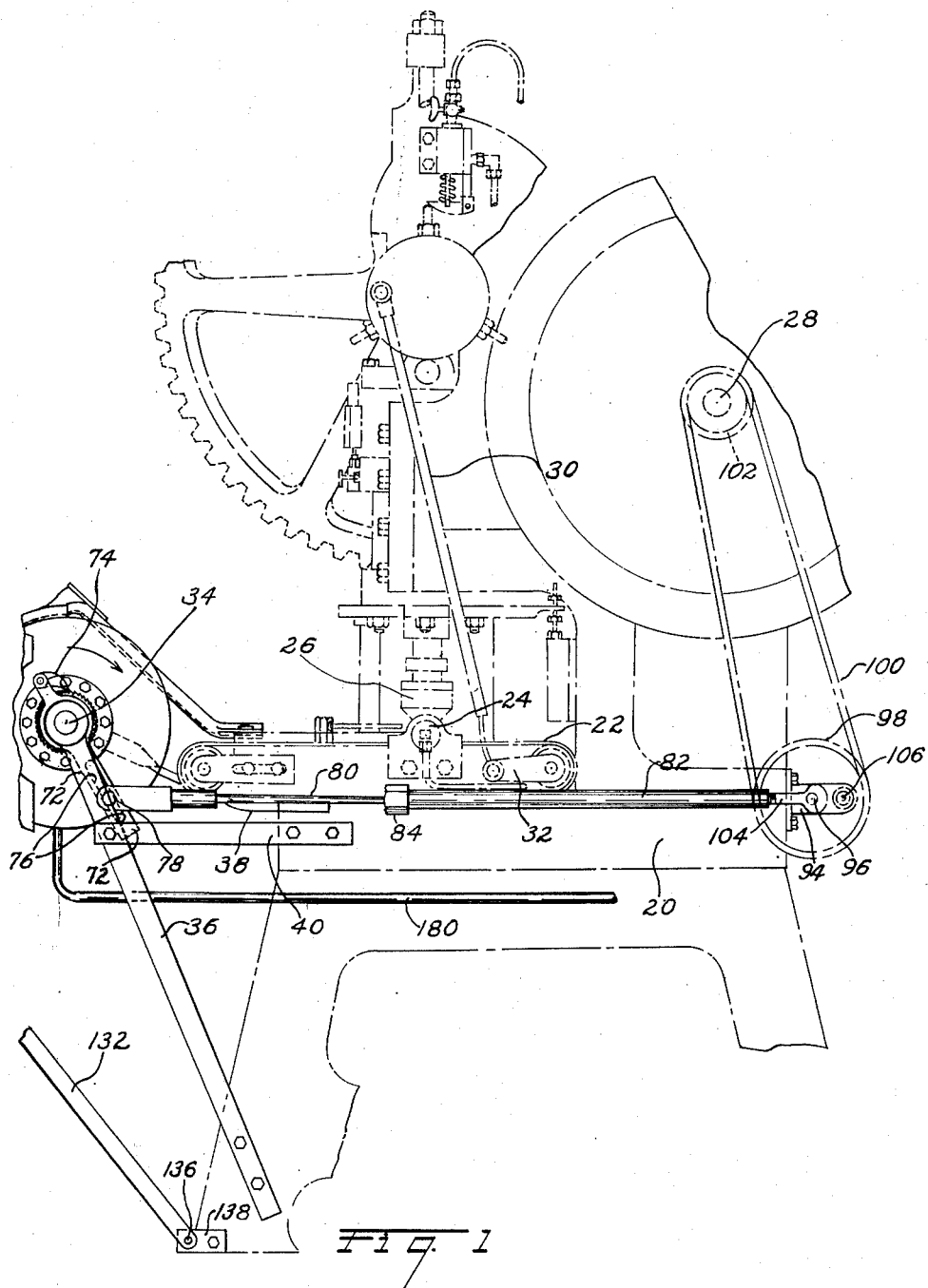
Figure 1 is a side elevation illustrating certain parts of the present invention in assembled relation with the lock-nut making machine of the Tripp application Ser. No. 568,501.
Figure 2:
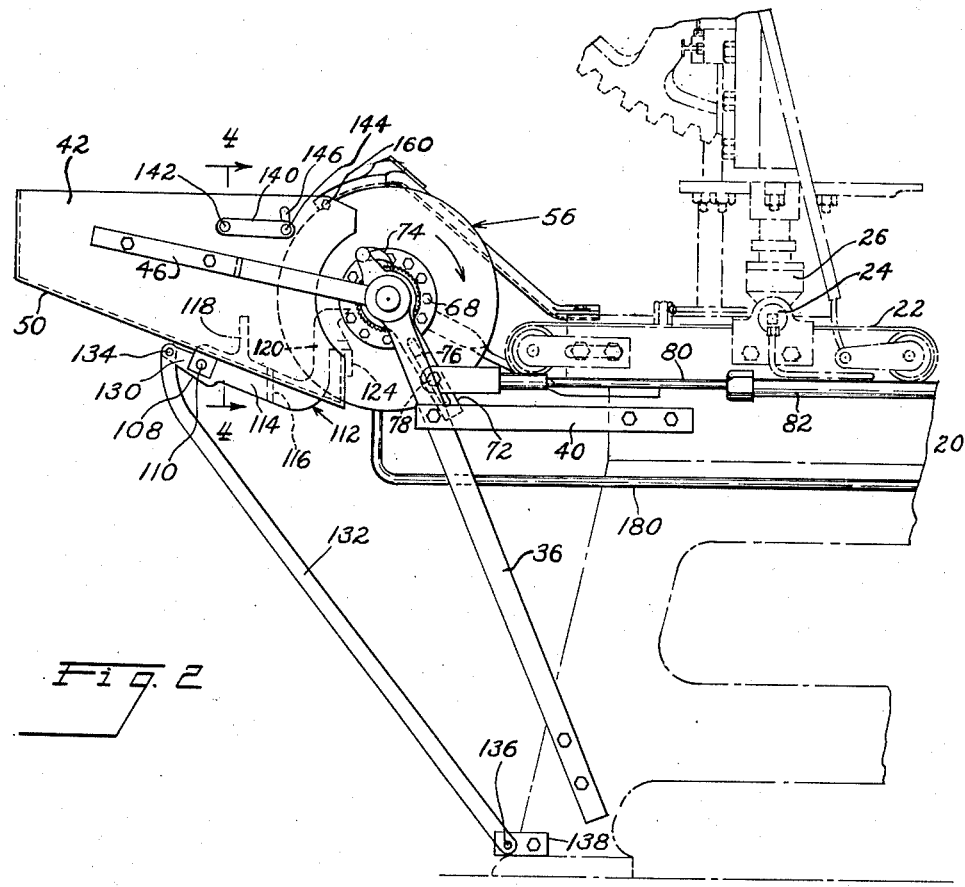
Figure 2 is a similar view illustrating other parts of the invention not seen in Figure 1.

For the purpose of explaining one practical application of the present invention, in Figures 1, 2 and 3 of the drawings I have illustrated in broken lines those parts of a lock-nut making machine with which the novel work feeding mechanism is cooperatively associated. However, it will be understood, as this description proceeds, that the present invention is of more or less general utility and may be employed for the automatic feeding of work-pieces from a supply hopper to other machines designed to produce a wide variety of different products.

As herein shown, the machine includes a bed plate 20 above which transversely spaced conveyor belts 22 are mounted and intermittently operated to convey work-pieces deposited thereon rearwardly to the work stations of the machine where work gripping and positioning devices are located embodying fluid pressure actuated plunger members 24 which transversely displace the work pieces from the conveyor belts and securely hold the same in accurate alignment with the vertically reciprocating fluid pressure actuated tools indicated at 26. In the present instance, the work-pieces are standard nut blanks and the tools 26 are indenting dies which indent one end of the nut at the bore thereof and distort the nut threads.

The main shaft 28 of the machine, driven from a motor or other suitable source of power, is connected by suitable gearing with an operating shaft for the tools or dies 26 and a pitman rod 30 eccentrically connected with one end of the shaft is operatively connected with an actuating arm 32 for a ratchet type clutch, whereby the intermittent movements are transmitted to the conveyor belts 22. For a further detail understanding of the machine, reference may be had to the above mentioned Tripp application, Ser. No. 568,501.

In the application of the present invention to the above described machine, a transverse shaft 34 is rigidly supported, in advance of the conveyor belts 22, in the upper ends of the bars 36 and 38 secured respectively to one of the supporting standards for the machine bed 20 and to the upper surface of said bed. Shaft supporting bar 36 is preferably braced by means of the horizontal bar 40 secured thereto and to one side of the machine bed 20.

A hopper 42 is provided upon its rear end wall with spaced bracket sleeves 44 rockably mounted on the shaft 34. The hopper is further supported for vertical vibrator movement by the arm 46 securely fixed at one of its ends to one side wall of the hopper and rotatively mounted at its other end upon one end of the shaft 34. As seen in Figure 4 of the drawings, the opposite side wall of the hopper, indicated at 48, inclines or slopes downwardly transversely of the hopper to a relatively narrow horizontal bottom wall section 50 which is longitudinally inclined downwardly toward the shaft 34 as seen in Figure 2 of the drawings. In the lower end portion of the bottom wall section 50 of the hopper and adjacent its juncture with the inclined wall section 48, a longitudinally extending slot 52 is formed therethrough and intermediate of its ends communicates with a transverse slot 54 in the bottom wall section 50 of the hopper. The purpose of these slots will be presently explained.

Upon the shaft 34 a pick-up wheel or disk 56 is loosely mounted and extends into the forward end of the hopper 42 in the vertical plane of the bottom wall section 50 thereof. This disk is formed from a suitable non-magnetic material, preferably aluminum, and, as shown in Figure 10, is provided with a plurality of circumferentially spaced V-shaped slots 58 extending radially thereof and opening upon one side face and the periphery of the disk. In these slots, the permanent magnet bars 60 of V-shaped form are snugly fitted and retained therein by means of the face plate 62 secured to one side of the disk 56 by the screws indicated at 64. As clearly seen in Figure 8 of the drawings, the exposed ends of the magnet bars 60 are substantially flush with the peripheral surface of the disk 56.

Figure 7:
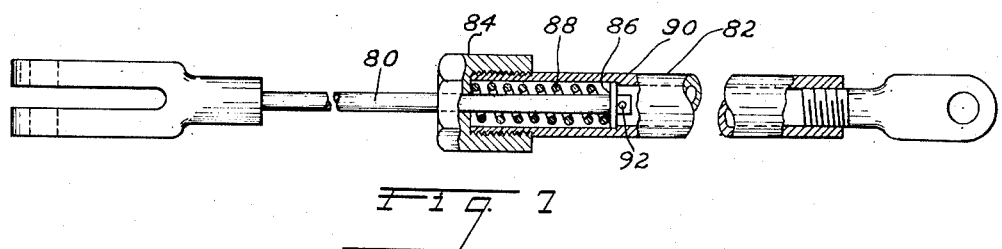
Figure 7 is a detail sectional view showing the overload release in the operating means for the pick-up device.

To the opposite or outer side face of the disk 56 the flanged end of a hub 66 is secured by means of the screws indicated at 68. The other end of this hub is formed upon its periphery with the ratchet teeth 70. Between said hub and the end of the hopper supporting arm 46, the upper end of a lever 72 is rockably mounted on the shaft 34 and carries a pivoted pawl or dog 74 coacting with the ratchet teeth 70 of the hub 60. This lever extends downwardly from the shaft 34 and is provided with a slot 76 in which a pin 78 in the forked end of a rod 80 is slidably engaged. As seen in Figure 7 of the drawings, the rear end of this rod extends into the forward end of a tubular rod 82 and through the nut 84 threaded thereon. Between said nut and a washer plate 86, a coiled spring 88 surrounds said rod and normally urges the washer plate against an internal shoulder 90 on the tubular rod 82. A pin 92 in the end of rod 80 prevents axial displacement of the washer plate 86 therefrom in the relative axial movement of the rods 80 and 82. Upon the rear end of the machine bed 20, suitable bearing means 94 is securely fixed, in which a short transverse shaft 96 is journaled. To the outer end of this shaft a pulley 98 is fixed and connected by belt 100 with a smaller pulley 102 on the main drive shaft 28 of the machine. A coupling member 104 threaded in the rear end of tubular rod 82 is pivotally connected with the crank pin 106 carried by pulley 98. Thus it will be apparent that in the operation of the machine an oscillating motion is imparted to lever 72 about the axis of shaft 34, which, through the pawl and ratchet connection, intermittently rotates the magnet-carrying disk 56 in a clockwise direction. Normally the rods 80 and 82 are reciprocated as a unit, but the device shown in Figure 7 provides a safety overload release so that in the event of abnormal resistance to the rotation of the work pick-up disk 56, the tubular rod 82 may have an independent axial movement with respect to rod 80 against the resistance of spring 88.

To the bottom wall 50 of hopper 42, forwardly of the slot 52, spaced depending apertured lugs 108 are secured and provide a pivot bearing 110 for the lever member 112 shown in detail in Figure 11 of the drawings. This lever member includes an elongated body portion 114 extending upwardly through and above the slot 52 in the bottom wall of the hopper, in the normal position of said lever, as seen in Figure 2 of the drawings. A vertically disposed transversely projecting flange 116 on one side of the lever member is movable through the transverse slot 54 in the hopper wall 50. Between this flange and the pivot bearing 110, the lever member is formed with an upwardly projecting arm or extension 118. At the rear end of the body portion 114 of the lever, the vertically disposed arm 120 is formed and extends upwardly within the hopper 42 adjacent to the inner side of the magnet-carrying disk or wheel 56. This arm is provided with a horizontal shoulder 122 to normally engage a suitable stop 124 fixed to the rear end wall of the hopper, said arm terminating at its upper end in an angularly projecting lug or nose 126 which is adapted for engagement by a plurality of suitably spaced pins or studs 128 fixed to the face plate 62 of the work pick-up disk 56. At its pivotally mounted end the lever 112 is formed with an extension 130 projecting forwardly below the hopper wall 50. As shown in Figure 2 of the drawings this extension is pivotally connected as at 134 to the upper end of a lever 132, the lower end of which is pivotally connected as at 136 to a bracket member 138 fixed to the machine frame.

Above the lever member 112, a link 140 is pivoted at one of its ends as at 142 upon the outer side wall of the hopper 42 and is provided at its other end with a pin 144 extending inwardly through the short slot 146 in the hopper wall. As will be later explained, this pin is adapted to engage work pieces improperly positioned upon the periphery of the magnet-carrying disk and return the same to the hopper.

As most clearly seen in Figure 3 of the drawings, the work pieces are adapted to be alternately delivered from a main guide chute 148 extending transversely in one direction beyond the rear upper end of the hopper 42 to the diverging branch chutes 150 which are rigidly connected to the latter end of chute 148 by an appropriately formed joint member 152. Preferably, chute 148 is slightly inclined downwardly from the hopper. The chutes 148 and 150 are disposed in a common vertically inclined plane, the rear lower ends of the branch chutes 150 being horizontally extended as at 154 and bolted or otherwise rigidly secured to the upper surface of the machine bed 20 and in substantial alignment with the forward ends of the respective conveyor belts 22.

As shown most clearly in Figures 5 and 6 of the drawings, adjacent to its other end the main guide chute 148 is twisted to provide a cam portion 156 and the terminal entrance portion 158 for the work-pieces, overlying the magnet-carrying disk 56 and extending for a short distance circumferentially thereof and terminating adjacent to the inner face of the outer side wall of the hopper 42 at the rear end thereof. If desired, the outer edge of this terminal part 158 of the chute may be provided with a stud 160 extending outwardly through a short slot in the side wall of the hopper. The end edge of the bottom wall of the chute portion 158 lies closely adjacent to the periphery of the work pick-up disk 56.

As thus far described, it will be understood that in the intermittent rotary movement of the disk 56, the pins 128 carried thereby will strike the nose or lug 126 on the lever 112 and rock said lever upwardly about the pivot 110. The parts 116 and 118 on said lever, as they are thus moved upwardly into the hopper, lift the individual work-pieces therein and tend to properly position the same adjacent to the periphery of the disc 56 as it moves upwardly through the hopper. By reason of the relative location of the pivots 110, 134 and 136, the hopper will also be vertically vibrated and thereby aid in the positioning of the work-pieces so that they will be attracted by the magnet bars 60 and held in the proper position on the periphery of the disc 56. As shown in Figures 5 and 6 of the drawings, the nut blanks 162 are provided adjacent to one of their ends with an outer peripheral groove 164, and the end face of the nut adjacent to this groove receives the indentation made by the machine die 26. Therefore, the opposite end face of the nut should be opposed to the periphery of the disc 56 when the nut is picked up by one of the magnets 60 so that the nut will finally be delivered to the work-forming station of the machine in the proper position. Any nut which may happen to be attracted to the periphery of the disk 56 and held in an edgewise position thereon will encounter the pin 144 and be dislodged from the magnet disk and returned to the hopper. The other nuts attracted by the magnets 60 and held on the periphery of the disk may or may not be in the correct position. In the rotation of the disk these nuts successively move into the entrance end 158 of the chute 148 and by contact with each other, are pushed through the twisted or cam portion 156 of the chute which turns the same to a vertically oblique position within the transversely extending part of the chute 148. Just beyond the cam portion 156 of the chute, an automatic selector returns incorrectly positioned nuts to the hopper 42.

As most clearly seen in Figures 12 and 13 of the drawings, the front obliquely inclined side wall of the chute 148 is disposed immediately above the upper edge of the rear end wall of the hopper 42. This part of the chute passage 166 is of greater width than the maximum dimension of the nut 162 and said front side wall of the chute is provided with an elongated opening 168 extending transversely beyond the lower edge of the chute passage but having its upper edge spaced below the upper edge wall of said passage to provide a supporting part 170 for the upper side of the nut as it passes over the opening 168. At the lower side of the nut, if properly positioned in the guide chute, the knife edge of a selector blade 172 secured to the lower edge portion of the chute by suitable screws 174 engages in the peripheral groove 164 of the nut so that this blade and the part 170 of the chute wall will provide adequate support, retaining the nut in the chute channel in its passage over the opening 168. In the event that the nut was not picked up in the correct position by the magnet disk 156 and is reversely disposed from the position shown in Figure 12, the selector blade 172 will not engage in groove 164 so that there will then be no support for the nut at the lower side thereof and it will drop by gravity off of the part 170 of the chute wall and through opening 168 into the hopper 42.

The means for effecting the alternate distribution of nuts from the main guide chute 148 into the branch delivery chutes 150 is shown most clearly in Figures 3, 14 and 15 of the drawings, from reference to which it will be noted that the connecting or joint member 152 between the main and branch guide chutes is formed with an upwardly extending arm 176 in alignment with one of the branch chutes 150. Upon this arm a fluid pressure receiving cylinder 178 is rigidly mounted and suitably connected at its upper end with the pipe line 180, to which high pressure fluid is periodically supplied through a suitable control valve (not shown). This valve may be similar to the valve shown in Figure 17 of the above mentioned Tripp application, and actuated at predetermined time intervals by a driven part of the machine. The plunger or piston 182 within the cylinder 178 is urged to normal retracted position by the spring 184 and the piston rod 186 extends through a suitable guide boss 188 on the connecting or joint member 152. This piston rod is in approximate axial alignment with the work guide channel or passage of one of the chute sections 150.

Between the upper ends of the branch delivery chutes 150 a roller 190, loosely mounted upon the pin 192 fixed at its ends in the connecting member 152, peripherally projects into the entrance ends of said chutes for contact with the nuts or other work pieces to maintain the same in proper alignment, in their passage from the main guide chute 148 into the diverging branch chutes 150. In the operation of the above described feed mechanism, as the wheel or disk 56 is revolved through the hopper 42, the magnets 60 pick up single nuts or work-pieces which are transferred to the main guide chute 148 in a vertically inclined position in the manner above explained. The magnets 60 are in sufficient number so that, allowing for the return to the hopper of incorrectly positioned work-pieces by the knock-off pin 144 and the selecting blade 172, the chutes 148 and 150 will be maintained substantially completely filled with the nut blanks, in successive contact with each other. The pull of the magnet upon the blank entering the end 158 of chute 148 is sufficiently strong so that the nut blanks in advance thereof will be pushed through the cam section 156 of the chute and past the selector blade 172. The natural path of movement of the nut blanks from the main chute 148 through the connector 152 is into the right-hand branch chute 150 shown in Figure 3. However, air or other pressure fluid is admitted to cylinder 178 at properly timed intervals to actuate plunger 184 so that plunger rod 186 will engage the side face of every other nut and deflect the same from said natural path of movement into the reversely inclined or left-hand branch delivery chute 150. As shown in Figure 14, the plunger 182 has been thus operated and nut A projected into the upper end of the left-hand branch 150, thus moving the line of nuts in this branch chute and expelling a nut from the lower horizontal end 154 thereof upon one of the conveyor belts 22. This movement of the nut A occurs in opposition to the pressure resistance of the adjacent nut B in the main chute 148 and is facilitated by the roller 190 contacting one of the side faces of the nut A.

Upon the release of air pressure from cylinder 178 and the retraction of plunger rod 186 by spring 184 to the position shown in Figure 15, in the continued transfer of nuts from the magnetic pick-up wheel 56 into guide chute 148, the nut B is moved into alignment with the line of nuts in branch chute section 150 from which a nut was ejected by plunger rod 186, and into contact with the adjacent nut C in the upper end of the right-hand branch chute 150. However, the following nut D in the chute 148 immediately displaces nut B into the upper end of the right-hand branch chute 150 and moves the line of nuts therein to expel a nut from the lower end of said chute upon the other of the conveyors 22. The nut D is then in position for engagement by the plunger rod 186 in the next operation thereof, whereby said nut will be projected into the upper end of the left-hand branch chute 150. Of course it will be understood that this alternate delivery of the nut blanks upon the conveyors 22 occurs while said conveyors are stationary so that the nuts will be in transverse alignment and positioned by the conveyors at the work stations of the machine for engagement by the gripping or holding devices at the same time.

However, it will be noted that should the movement of the work blanks through the main chute 148 or into and through the branch chutes 150 become blocked for any reason the surplus workpieces at the entrance end 158 of chute 148 will merely be displaced from the periphery of the magnet wheel or disk 56 and returned to the hopper 42. In the application of my novel work-feeding mechanism to certain machines not using the conveyors and work-gripping devices the branch chutes 150 may be arranged to directly discharge the work pieces to the work receiving stations of the machine. Also, in the application of the invention to machines of the single-unit type one of the branch chutes 150 and the fluid pressure operated distributing plunger would not be employed, the work-pieces being discharged from the single guide chute 148 to the work receiving station of the machine.

From the foregoing, it will be seen that I have devised a simple and inexpensive work-feeding mechanism for various types of high speed automatic machines which is operable to maintain a substantially constant feed of small work pieces and properly position the same for the operation of the machine tool thereon. Practical tests in connection with a nut lock making machine of the type above described, have demonstrated that the magnetic pick-up member or wheel 56 in its movement through the work-supply hopper, is highly efficient and reliable in its functional operation. The means for agitating the hopper and its contents assures the proper positioning of an adequate number of the work-pieces contiguous to the periphery of the wheel to be picked up by the individual magnets carried thereby so that in each of the intermittent movements of this wheel through the hopper a plurality of the nuts or work-pieces are transferred from the hopper to the main feed chute 148. It will further be noted that the mechanism embodies a minimum number of cooperating elements of simple and durable structural form whereby low production cost and minimum maintenance expense is realized.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In work feeding mechanism, a hopper, a member rotatably mounted for movement in a fixed path through said hopper, spaced means on said member operable in its movement through the hopper to pick up and convey individual work pieces externally of the hopper, a work receiving chute having an entrance end positioned in the path of the work pieces carried by said member and receiving the individual work pieces therefrom, means for operating said work pick-up member, means movably connected with the bottom of the hopper including an element extending within the hopper, and means on said pick up member engaging said element to actuate said last named means and agitate the work pieces and vertically vibrate the hopper.

2. In work feeding mechanism, a hopper, a member rotatably mounted for movement in a fixed path through said hopper, spaced means on said member operable in its movement through the hopper to pick-up and convey individual work pieces externally of the hopper, a work receiving chute having an entrance end positioned in the path of the work pieces carried by said member and receiving the individual work pieces therefrom, means for operating said work pick-up member, a lever pivotally mounted at one end on the bottom of the hopper and extending upwardly in the hopper at its other end adjacent to one side of said pick-up member, a link mounted at one end on a fixed pivot and pivotally connected at its other end to the pivoted end of said lever, and means on said pick-up member coacting with said lever to pivotally rock the same and agitate the work pieces in contact therewith and to vertically vibrate the hopper.

GAIL C. ABBOTT.

REFERENCES CITED

The following references are of record in the file of this patent:

UNITED STATES PATENTS

| Number | Name | Date |
| --- | --- | --- |
| Re. 13,731 | Gamper | May 19, 1914 |
| 135,329 | Glidden | Jan. 28, 1873 |
| 461,649 | Taintor | Oct. 20, 1891 |
| 486,896 | Radcliffe | Nov. 29, 1892 |
| 962,030 | Kirkegaard | June 21, 1910 |
| 1,183,084 | La Porte | May 16, 1916 |
| 1,299,820 | Carper | Apr. 8, 1919 |
| 1,310,837 | Murch | July 2, 1919 |
| 1,420,936 | Morter | June 27, 1922 |
| 1,442,866 | Elliott | Jan. 23, 1923 |
| 1,882,130 | Fielder | Oct. 11, 1932 |
| 1,897,116 | Friedman | Feb. 14, 1933 |
| 1,926,048 | Kelleher | Sept. 12, 1933 |
| 2,060,182 | Dellaree | Nov. 10, 1936 |
| 2,066,869 | Wild | Jan. 5, 1937 |
| 2,186,841 | Rylander | Jan. 9, 1940 |
| 2,350,486 | Bailey | June 6, 1944 |
| 2,410,037 | Abbott | Oct. 29, 1946 |

FOREIGN PATENTS

| Number | Country | Date |
| --- | --- | --- |
| 132,763 | Great Britain | Sept. 25, 1919 |
| 389,042 | Germany | Jan. 25, 1924 |